(12) United States Patent
Osaka et al.

(10) Patent No.: US 6,441,638 B2
(45) Date of Patent: *Aug. 27, 2002

(54) BUS SYSTEM AND CIRCUIT BOARD

(75) Inventors: Hideki Osaka, Hiratsuka; Shinichi Suzuki; Akira Yamagiwa, both of Kanagawa-ken; Toshiro Takahashi, Hamura, all of (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/215,456

(22) Filed: Dec. 17, 1998

(30) Foreign Application Priority Data

Dec. 17, 1997 (JP) .............................................. 9-347911

(51) Int. Cl.$^7$ ........................ H03K 17/16; H03K 19/003
(52) U.S. Cl. .............................. 326/30; 326/26; 326/82; 326/86
(58) Field of Search .............................. 326/26, 30, 82, 326/86, 90

(56) References Cited

U.S. PATENT DOCUMENTS

| | | | | |
|---|---|---|---|---|
| 5,528,168 A | * | 6/1996 | Kleveland | 326/30 |
| 5,576,642 A | * | 11/1996 | Nguyen et al. | 326/86 |
| 5,594,370 A | * | 1/1997 | Nguyen et al. | 326/86 |
| 5,635,853 A | * | 6/1997 | Kikinis | 326/30 |
| 5,757,249 A | * | 5/1998 | Gabara et al. | 333/101 |
| 5,982,192 A | * | 11/1999 | Saito | 326/30 |
| 6,014,037 A | * | 1/2000 | Gabara et al. | 326/30 |

OTHER PUBLICATIONS

"Nikkei Electronics", Sep. 27, 1993, No. 591, pp. 269–290, published by Nikkei BP.

* cited by examiner

Primary Examiner—Michael Tokar
Assistant Examiner—Steven S. Paik
(74) Attorney, Agent, or Firm—Antonelli, Terry, Stout & Kraus, LLP

(57) ABSTRACT

A bus system with an improved propagation velocity, comprising main lines, and a plurality of stub lines provided on a one-to-one correspondence with a plurality of modules, and connecting the corresponding modules to the main lines.

9 Claims, 21 Drawing Sheets

BUS SYSTEM AND CIRCUIT BOARD

BACKGROUND OF THE INVENTION

1. Field of the Invention

The present invention relates to technology for signal transmission between devices, such as a processor and a memory (between digital circuits formed by CMOS, for example, or between their functional blocks), and more particularly to technology for high-speed bus transmission among a plurality of devices connected to the same transmission line.

2. Description of Related Art

Among technologies for high-speed transmission between digital circuits formed with semiconductor integrated circuit devices, there is technology related to low-amplitude bus interfaces. Data output drivers used in the bus interface circuits are broadly divided into the open drain type circuits, a representative example of which is the GTL (Gunning Transceiver Logic) circuit, and the push-pull type circuits, representative examples of which are the CTT (Center Tapped Termination) interface circuit and the SSTL (Stub Series Terminated Logic) interface circuit. In data input receivers, the comparator type is generally used which compares input data with a reference voltage (Vref). The above-mentioned low-amplitude bus interfaces are described in detail in Nikkei Electronics, Sep. 27, 1993 issue (No.591) pp. 269–290, published by Nikkei BP.

With the progressive speedup of semiconductor integrated circuits in recent years, the rise time and the fall time of the leading and trailing edges of signal waveforms are decreasing, with the result that the waveform distortion due to mismatch of impedances is becoming too large to disregard. For this reason, as technology for eliminating the mismatch of impedances, the so-called matched termination method has been proposed, which terminates each end of the bus with a resistance equal to the bus line impedance.

FIG. 2 is a schematic block diagram of a bus system to which the conventional matched termination method is applied.

Reference numeral 50 denotes a main line of the bus, 51a to 51e denote stub lines of the bus, 52a to 52e denote drivers, 53a to 53e denote receivers, 54a to 54e denote modules, 55 denotes terminating resistors (Rtt) and 56 denotes the terminal voltages (Vtt). Reference numerals 57a to 57e denote branch points (connection points) of the stub lines 51a to 51e from the main line 50.

In the bus system in FIG. 2, the drivers 52a to 52e and the receivers 53a to 53e are arranged in pairs, and those pairs are respectively contained in a plurality of modules 54a to 54e, and connected through the stub lines 51a to 51e to the main line 50. The drivers 52a to 52e and their corresponding receivers 53a to 53e form the bus interface circuits of modules, each containing a driver and a receiver.

Though not illustrated, a logic circuit (LSI) for data transfer through the bus interface circuit is included in each module. Each bus interface circuit may be fabricated together with a logic LSI in the same chip or they may be fabricated separately.

Each end of the main line 50 is connected to a terminating resistor (Rtt) 55 that is connected to a terminal end voltage source (Vtt) 56, by which matched termination is obtained.

As described above, in the conventional bus system, the bus interface circuits (receivers/drivers) are connected through the stub lines to one main line.

In the transfer of data in such a bus system, the time of signal propagation varies with the position of the modules (more specifically, the position of the bus interface circuits) connected to the bus.

For example, when data is transferred from the driver 52d to the receiver 53e, a data signal goes along the stub line 51d, passes through the branch point 57d to the branch point 57e of the main line 50, and through the stub line 51e, and reaches the receiver 53e. On the other hand, when data is transferred from the driver 52a to the receiver 53e, a data signal travels along the stub line 51a, through the branch point 57a to the branch point 57e of the main line 50, and through the stub line 51e, and reaches the receiver 53e. In other words, if the data propagation time is compared between a case where data is transferred from the driver 52a to the receiver 53e and a case where data is transferred from the driver 52d to the receiver 53e, the propagation time in the former case is delayed by a period of time corresponding to a length of wiring between the branch points 52a and 57d of the main line 50.

The differences in propagation time among the modules at different positions become greater as the number of modules (more specifically, the number of the bus interface circuits) connected to the bus increases. The reason for this is that the wiring length of the main line becomes longer as the number of modules increases.

As the number of modules connected to the bus increases, the number of stub lines required to connect the modules to the main line increases, and accordingly the total capacitance of the stub lines increases, so that the effective velocity of propagation decreases.

In other words, the effective propagation velocity Vp' of a signal, which propagates on the main line to which the stub lines are connected, decreases according to the amount of increase in the capacitance of the stub lines connected to the main line as compared with the propagation velocity Vp when there is only the main line (without the stub lines). The relational equation is shown below.

$$Vp' = Vp/(1+\Delta C/Co)^{\frac{1}{2}} \qquad (\text{Eq.1})$$

Where ΔC is the capacitance of the stub lines as viewed from the main line, and includes the input capacitance of the modules connected to the stub lines. Co denotes the line capacitance between the branch points of the main line 50 on which a data signal propagates. From this equation, it is understood that the more stub capacitance ΔC increases, the more effective propagation velocity Vp' decreases.

In the conventional bus system, the above-mentioned problems hinder the attempts to achieve high-speed signal transmission.

SUMMARY OF THE INVENTION

The present invention has been made to solve those problems, and has as its object to speed up the bus system and improve the system performance.

Specifically, the propagation time among the modules is shortened to thereby speed up the bus system and improve the system performance.

The noise of the propagating signal waveform between the modules is reduced to accelerate the speed of the bus system and improve the system performance.

In order to solve the above problems, according to a first embodiment of the present invention, there is provided a bus system for data transfer among a plurality of interface circuits, which comprises:

at least two main lines connected together at opposite ends; and a plurality of stub lines provided on a one-to-one correspondence with the above-mentioned plurality of interface circuits and connecting the corresponding interface circuits to one of the above-mentioned at least two main lines.

The first embodiment of the present invention, due to the above-mentioned structure, has the following advantages over the conventional bus system using one main line.

(1) If the lengths of wire between the branch points of the stub lines from the main line are set to be equal, the length of the main line on which data travels when it propagates between the mutually remotest interface circuits can be reduced to almost less than a half of the distance it would otherwise have to travel. Therefore, the data propagation time between the mutually remotest interface circuits can be made shorter. Furthermore, the differences in data propagation time between the interface circuits can be reduced.

(2) In the propagation of data between the mutually remotest interface circuits, the number of branch points of the stub lines from the main line that the data travels can be reduced. In other words, it is possible to reduce the number (capacitance) of the stub lines that affect the data waveform and the data propagation time. Let us discuss a concrete example. It can occur that the wiring length of the main line between the branch points of the stub lines from the main line must become longer than in the prior art for the structural reason of a circuit board that uses the bus system according to the present invention. In the case mentioned above, more specifically, even when the modules are mounted on one surface of the circuit board, the data propagation time between the mutually remotest interface circuits can be shortened. Furthermore, the differences in the data propagation time between the interface circuits can be reduced.

Thus, the speedup of the bus line can be achieved, which contributes to the improvement in the system performance.

According to a second embodiment of the present invention, there is provided a bus system for data transfer between a plurality of interface circuits, which comprises:

a main line in a ring form;

an interface circuit for data transmission, connected through a stub line to the main line;

a resistor having a constant voltage applied, and connected at the electrically remotest end position from the above-mentioned interface circuit for data transmission on the main line; and a plurality of interface circuits for data reception, respectively connected to the main line through stub lines.

The second embodiment of the present invention, by its configuration mentioned above, achieves the same effects as in the first embodiment. Data transmitted from the data-transmitting interface circuit propagates clockwise and counterclockwise on the main line, and data on the CW route and data on the CCW route almost simultaneously reach the connection point of the resistor with the main line. By setting a value of the resistor so that a signal wave passing the connection point and a reflected wave produced at the connection point cancel each other out, perfect termination can be achieved.

In the second embodiment, a driver with an output impedance almost equal to the resistor may be used in place of the resistor.

According to a third embodiment of the present invention, there is provided a bus system for data transfer among a plurality of interface circuits, comprising:

a main line formed in a ring;

a plurality of stub lines connecting the above-mentioned plurality of interface circuits to the above-mentioned main line; and a plurality of resistors having a constant voltage applied, and provided on a one-to-one correspondence with the above-mentioned plurality of interface circuits, wherein each of the above-mentioned resistors is connected to the main line through a switch at the electrically remotest end position from the corresponding interface circuit, and wherein each of the above-mentioned interface circuits has means for outputting a control signal to turn on the switch connected to the corresponding resistor before sending data onto the main line.

The third embodiment, by the above-mentioned arrangement, achieves the same effects as in the first and the second embodiments. Moreover, the third embodiment can terminate the bus with a perfect termination when data is output from any interface circuit.

In the third embodiment, a driver which conducts in response to a control signal can be used in place of the resistor connected through the switch.

DETAILED DESCRIPTION OF THE PREFERRED EMBODIMENTS

A first embodiment of the present invention will now be described in the following.

Figure 1:
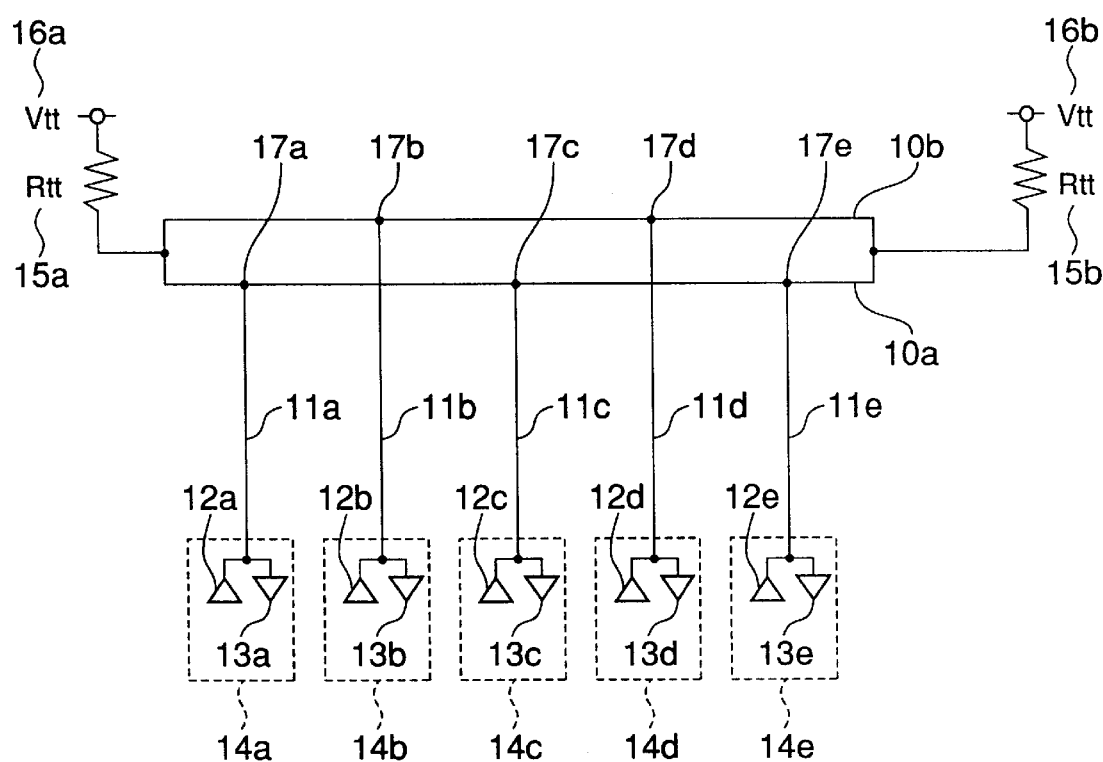
FIG. 1 is a schematic block diagram for explaining a bus system to which a first embodiment of the present invention is applied.

FIG. 1 is a schematic block diagram for explaining the bus system to which the first embodiment of the present invention is applied.

In FIG. 1, reference numerals 10a, 10b denote main lines of the bus, 11a to 11e denote stub lines of the bus, 12a to 12e denote drivers, 13a to 13e denote receivers, 14a to 14e denote modules, 15a and 15b denote resistors (Rtt), 16a and 16b denote constant-voltage sources (Vtt), and 17a to 17e denote branch points (connection points) of the main lines 10a, 10e and the stub lines 51a to 51e.

In the bus system according to the first embodiment, as shown in FIG. 1, the drivers 12a to 12e and the receivers 13a to 13e are arranged in pairs, and those pairs are respectively contained in a plurality of modules 14a to 14e, and are connected through the stub lines 11a to 11e to the main lines 10a, 10b. The stub lines 11a to 11e are alternately connected to the main lines 10a and 10b.

The drivers 12a to 12e and the corresponding receivers 13a to 13e jointly form bus interface circuits of modules, each containing a driver and a receiver. Note that though not illustrated, each module has fabricated therein a logic circuit (LSI) for transferring data through the bus interface circuit. Each bus interface circuit may be fabricated together with a logic circuit (LSI) in the same circuit, or the bus interface circuit may be fabricated separately from the logic circuit LSI.

The main lines 10a, 10b are joined together at one end with a resistor (Rtt) 15a which is connected at one end to a constant-voltage source (Vtt) 16a. The main lines 10a, 10b are connected together at the other end with a resistor (Rtt) 15b which is connected at one end to a constant-voltage source (Vtt) 16b. By connecting the main lines 10a, 10b as described, a ring bus is formed.

The two resistors (Rtt) 15a, 15b are connected to the main lines 10a, 10b at the mutually remotest ends in terms of electrical characteristics through the main lines 10a, 10b (on an equivalent circuit). If the characteristic (line) impedance of the main lines is designated as Zo, the resistors (Rtt) 15a, 15b have about the same resistance value as Zo.

In the bus system according to the first embodiment, due to the above-mentioned configuration, a signal sent out from one of the drivers 12a to 12e propagates clockwise and counterclockwise on the main line (from the branch point 17a, 17c or 17e on the main line 10a; and from the branch point 17b or 17d on the main line 10b), and reaches all the receivers 12a to 12e. In this embodiment, if the passages between adjacent branch points 17a to 17e (including the passages between 17a and 17b and between 17d and 17e) are called sections, even when a signal propagates between the mutually remotest modules, the length the signal travels on the main line is two sections or less.

For example, if a signal is sent out from the driver 12a, the signal passes through the stub line 11a, turns at the branch point 17a and goes clockwise and counterclockwise on the main line 10a. The signal that goes counterclockwise passes through the branch point 17c and the stub line 11c and reaches the receiver 13c, and also passes through the branch point 17e and the stub line 11e and reaches the receiver 13e.

On the other hand, the signal that goes counterclockwise from the branch point 17a passes through the branch point 17b and the stub line 11b and reaches the receiver 13b, and also goes through the branch point 17d and the stub line 11d and reaches the receiver 13d.

Figure 2:
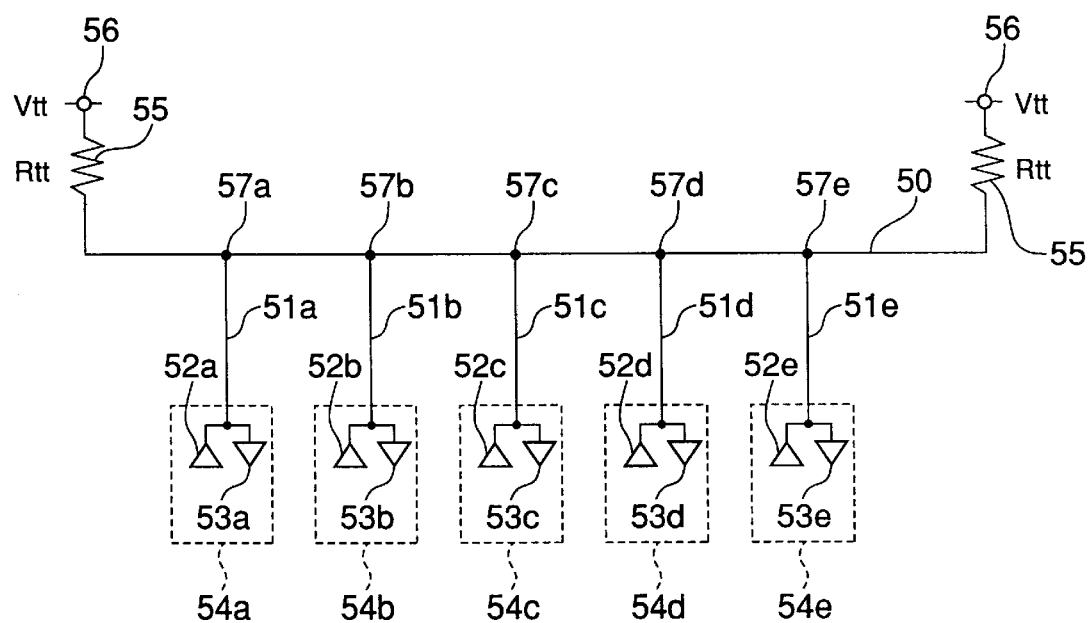
FIG. 2 is a schematic block diagram for explaining an example of a bus system to which the conventional matched termination method is applied.

If the wiring length of each section on the main lines 10a, 10b is made the same as in the bus system described when reference was made to the prior art (see FIG. 2), the wiring length for data propagation on the main lines between the mutually remotest modules can be made almost less than a half of the length in the prior art. Therefore, the data propagation time between the mutually remotest modules can be reduced. Differences in data propagation time between the modules can be reduced.

Compared with the bus system described with reference to the prior art, the number of branch points on the main line on which data travels in data propagation between the mutually remotest modules can be reduced. In other words, the number (capacitance) of the stub lines, which adversely affects the data waveform and the data propagation time can be reduced. Therefore, when it is necessary to use a longer length of wiring for the main line between the branch points of the stub lines from the main line because of the configuration design of the circuit board which utilizes the bus system according to the present invention, to be more specific, even when the modules are mounted on one surface of the circuit board, the data propagation time between the mutually remotest interface circuits can be shortened. In addition, differences in data propagation time between the interface circuits can be decreased.

For example, if the wiring length of the main line between the branch points is twice as long as that in the prior-art bus system described above, the wiring capacitance Co between the branch points of the main line, included in (Eq.1) shown earlier, becomes twice as large. However, the capacitance ΔC of the stub lines is decreased, and the result is that the effective propagation velocity is increased.

This effect will be described with reference to FIGS. 3 to 6.

Figure 3:
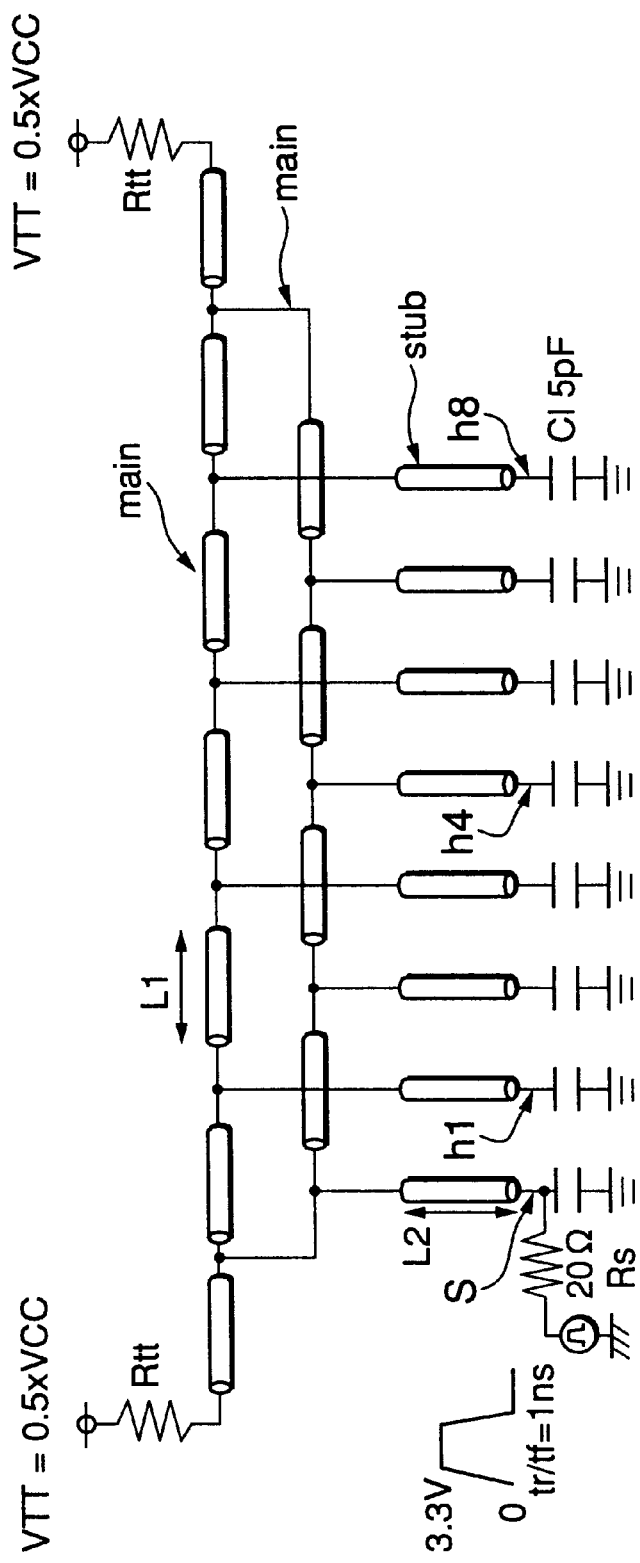
FIG. 3 is an equivalent circuit for the bus system in accordance with the first embodiment shown in FIG. 1.
Figure 4:
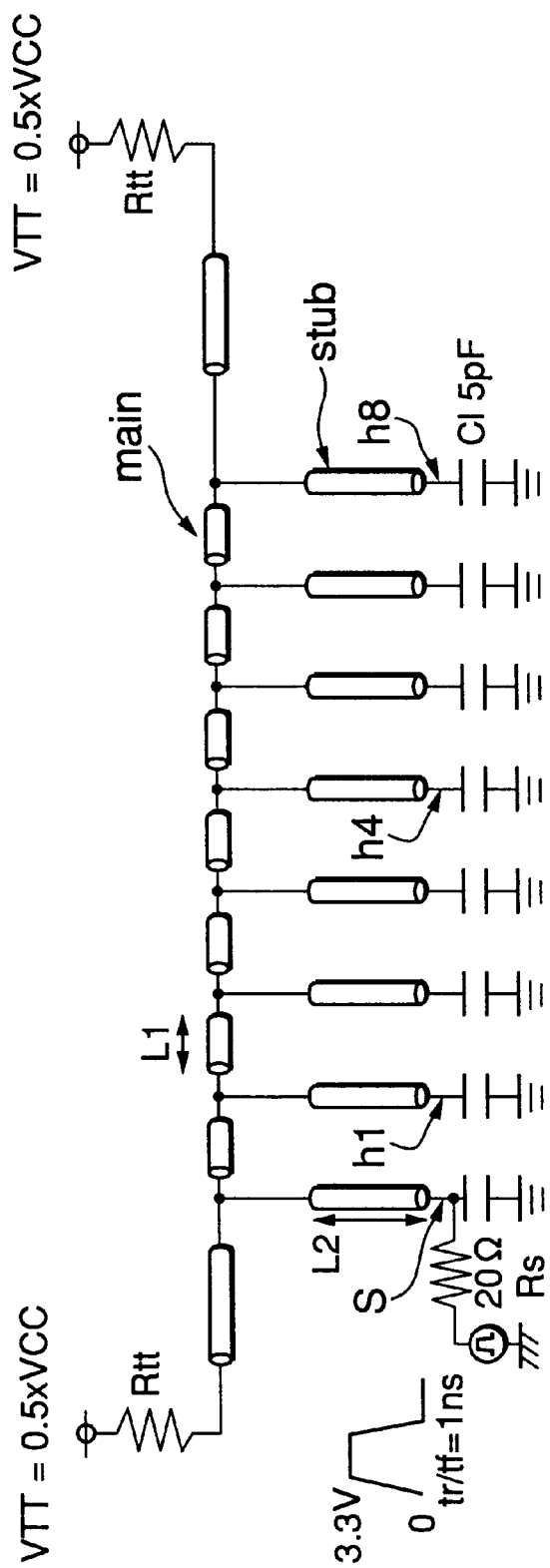
FIG. 4 is a bus system according to the present invention that can replace the conventional bus system shown in FIG. 2.

FIG. 3 is a diagram showing an equivalent circuit of the bus system according to the first embodiment depicted in FIG. 1. FIG. 4 is a diagram showing a bus system according to the present invention that can replace the conventional bus system depicted in FIG. 2. FIGS. 3 and 4 show equivalent circuits when CTT interface circuits are used as the interface circuits.

In FIGS. 3 and 4, the same number (8) of stub lines are respectively connected to the main line for the sake of comparison. The wiring length (L2) of the stub lines is 65 mm in FIGS. 3 and 4.

The receiver connected to each stub line has a high impedance, and therefore a capacitor (C1) having a value of 5 pF is used for the receiver with a high impedance in this equivalent circuit. A voltage pulse source with a source impedance (Rs) of 20Ω is used for the driver connected to each stub line. The voltage pulse source is supposed to output pulses at 100 Mbps (period: 10 ns). Suppose that the pulse amplitude is 3.3V and that the rise time (tr) and the fall time (tf) are 1 ns.

In FIGS. 3 and 4, the two resistors Rtt are 50Ω, respectively, and the voltages Vtt (=0.5×Vcc) of the constant-voltage sources are provided so that Vcc=3.3V.

In FIG. 3, the wiring length L1 of the main line between the branch points of stub lines from the main line is 100 mm. On the other hand, in FIG. 4, the wiring length L1 of the main line between the branch points of the stub lines from the main line is 50 mm. The line impedance of the main line and the stub lines is 50Ω.

Figure 5:
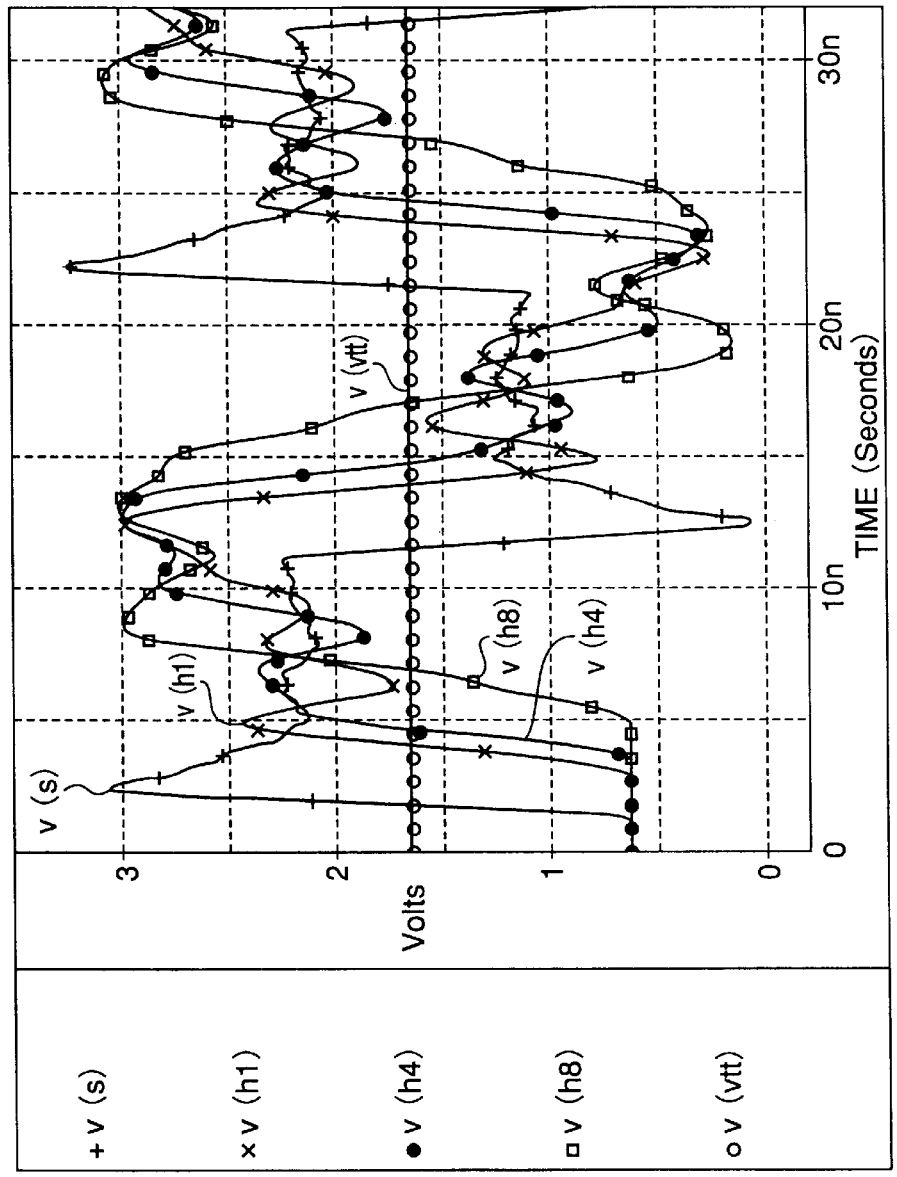
FIG. 5 shows results of analysis of signal waveforms at the source (driver) point S and the sink (receiver) points h1, h4 and h8 in FIG. 3.
Figure 6:
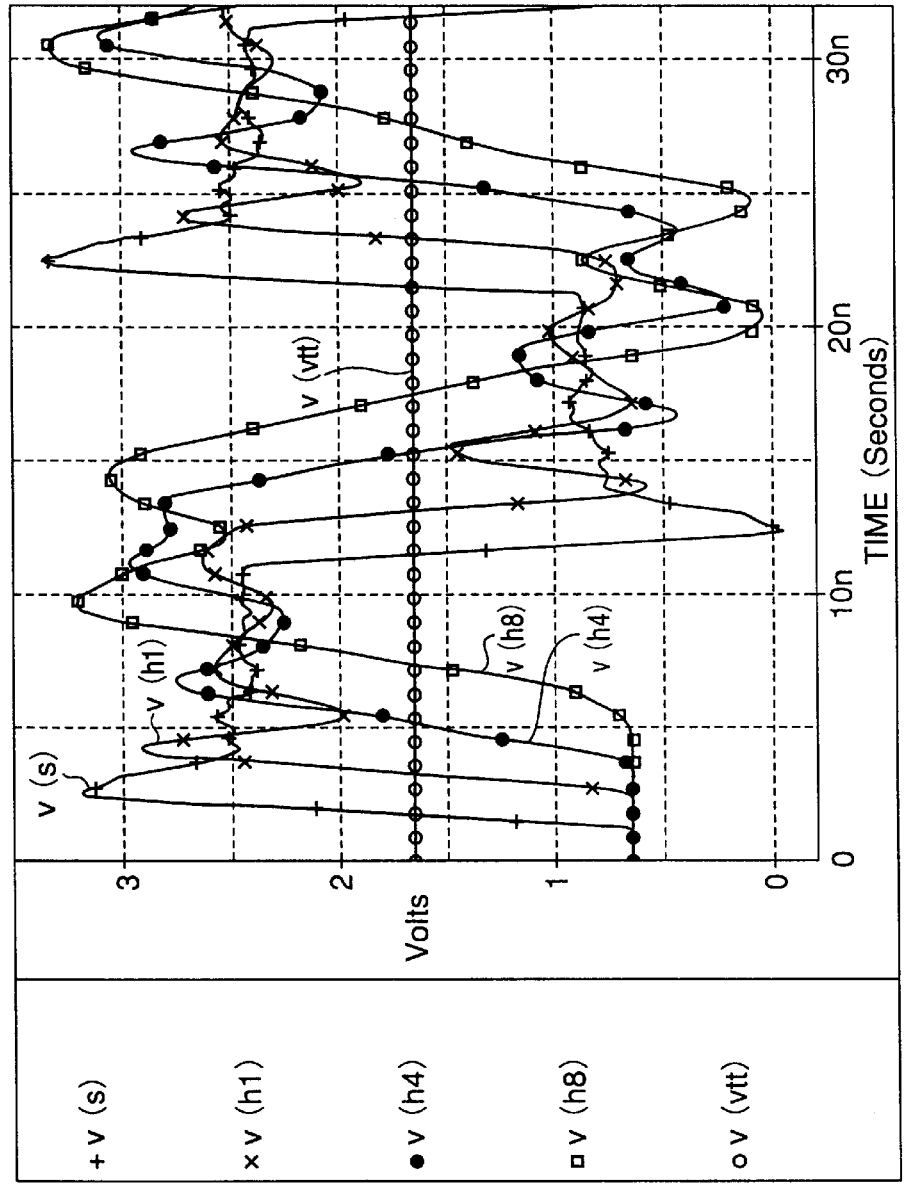
FIG. 6 shows results of analysis of signal waveforms at the source (driver) point S and the sink (receiver) points h1, h4 and h8 in FIG. 4.

FIGS. 5 and 6 respectively show analysis results of signal waveforms at the source (driver) point S and the sink (receiver) points h1, h4 and h8 in FIGS. 3 and 4.

Being a differential type input circuit, the receiver of the CTT interface circuit compares an input waveform with the threshold voltage Vref, and if the input waveform is higher or lower relative to the threshold voltage, it is considered that the input data has made a transition. Generally, in the CTT interface, Vref=Vtt.

In the analysis results shown in FIG. 6 (an analysis result of the conventional bus system in FIG. 4), the data propagation time from the source point S to the sink point h8 is 5.684 ns when Vref=Vtt. On the other hand, in the analysis results shown in FIG. 5 (an analysis result of the bus system according to the first embodiment), the propagation time is 5.147 ns. Therefore, data reaches the sink point h8 faster by 0.5 ns in the bus system according to the first embodiment.

This is due to the shorter data propagation time attributable to the reduction of the capacitance of the stub lines. The ratio of improvement is 10% over the data propagation time in the conventional bus system. As is obvious from this, in the bus system according to the first embodiment, even when the wiring length of the main line between the branch points of the stub lines from the main line is longer than that in the conventional bus system (for example, when the modules are mounted collectively on one surface of the circuit board), the data propagation time between the mutually remotest interface circuits can be made shorter than in the prior art. Moreover, differences in the data propagation time between the interface circuits can be reduced. In other words, the speedup of the bus system can be realized without making any changes to the space between the modules mounted on the circuit board or the load condition of the bus system.

In this embodiment, description has been given of the bus system in which the stub lines 11a to 11e are connected to two main lines 10a, 10b as shown in FIG. 1. However, the present invention is not limited to this configuration. Even when the stub lines 11a to 11e are connected to only one of the main lines 10a, 10b, the same effects can be obtained.

Figure 7:
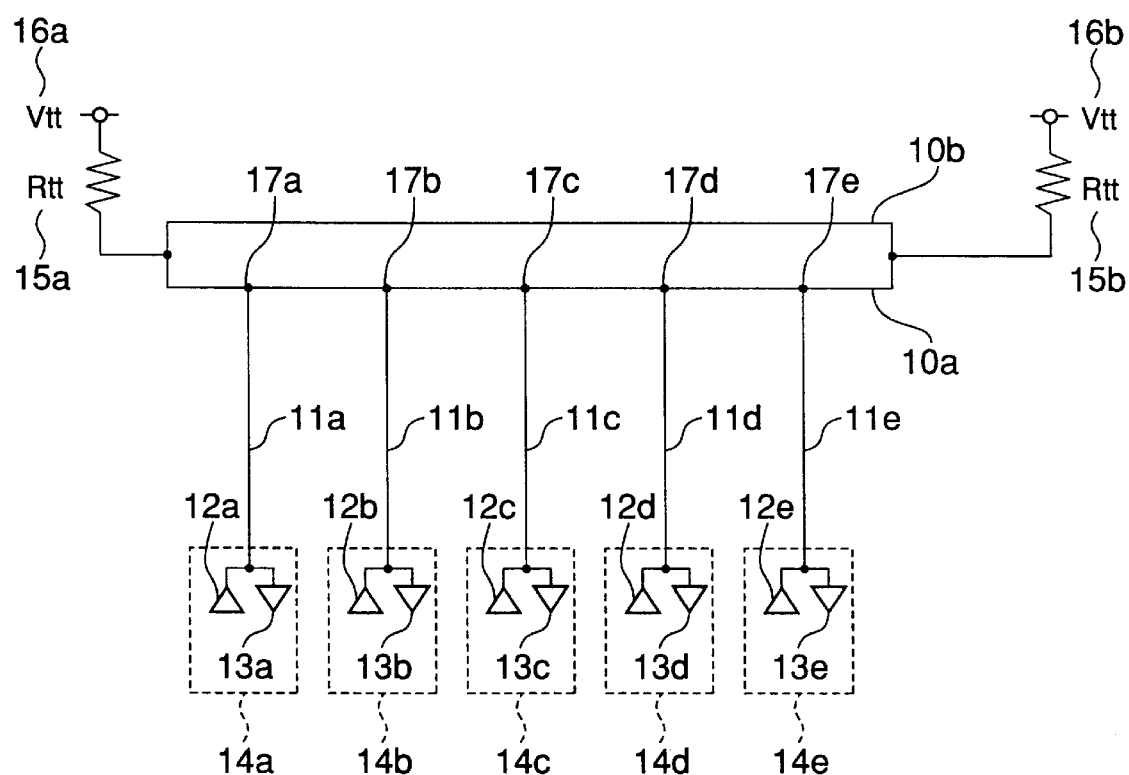
FIG. 7 is a diagram for explaining a modification of the bus system to which the first embodiment of the present invention is applied.

FIG. 7 is a diagram for explaining a modification of the bus system to which the first embodiment of the present invention is applied.

In FIG. 7, the stub lines 11a to 11e are all connected to the main line 10a. In this circuit configuration, because a signal propagating on the main line 10b is not affected by the capacitance of the stub lines, the propagation velocity becomes faster as is understandable from (Eq.1) shown earlier. Therefore, the data propagation time between the mutually remotest interface circuits (between 14a and 14e) can be made shorter than in the conventional bus system. In addition, differences in data propagation time between the interface circuits can be reduced.

This embodiment can be applied to the SSTL interface circuit set as a standard by JEDIC (Joint Electronic Device Engineering Council and EIAC (Electronic Industry Standard Architecture of Japan).

Figure 8:
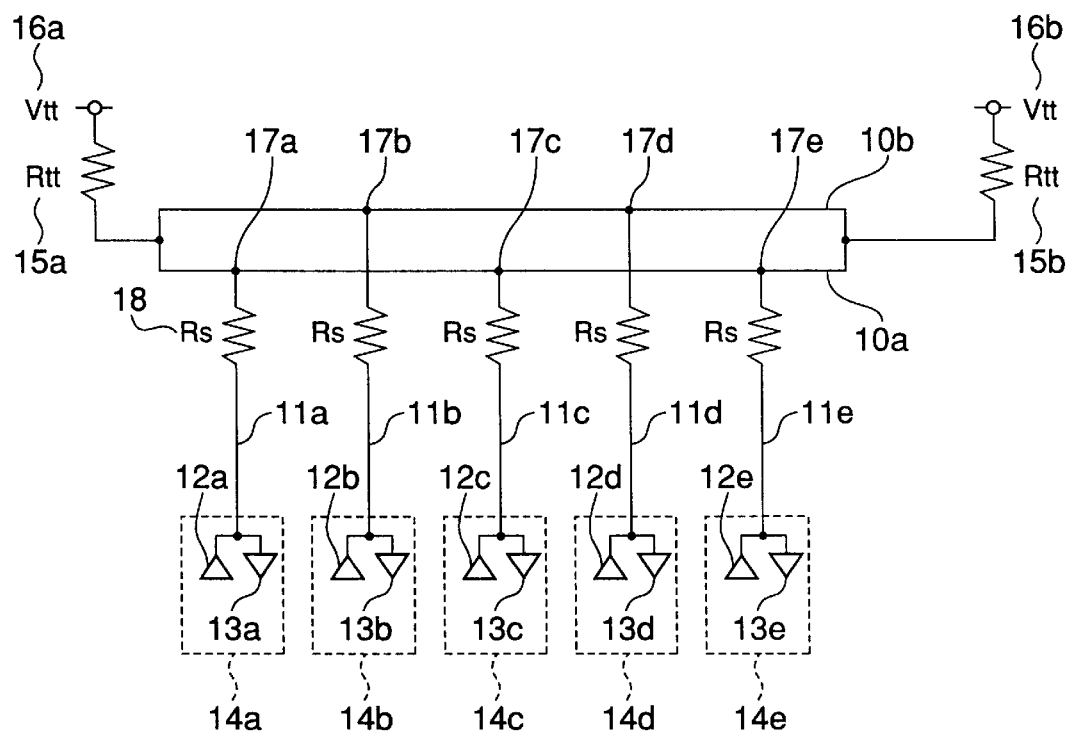
FIG. 8 is a diagram for explaining an example of the bus system with SSTL interfaces, to which the first embodiment of the present invention is applied.

FIG. 8 is a diagram for explaining an example of the bus system with SSTL interfaces, to which the first embodiment of the present invention is applied.

In FIG. 8, resistors (Rs) 18 for impedance matching at the branch points are inserted between the branch points 17a to 17e and the stub lines 11a to 11e. With this circuit configuration, the stub capacitance ΔC included in (Eq.1) remains unchanged, so that the effective propagation velocity Vp' can be improved as in the bus system in FIG. 1.

Needless to say, even when the SSTL interfaces are applied to the modified embodiment shown in FIG. 7, the same effects can be obtained.

Description will now be given of a circuit board using the bus system according to the first embodiment.

Figure 9:
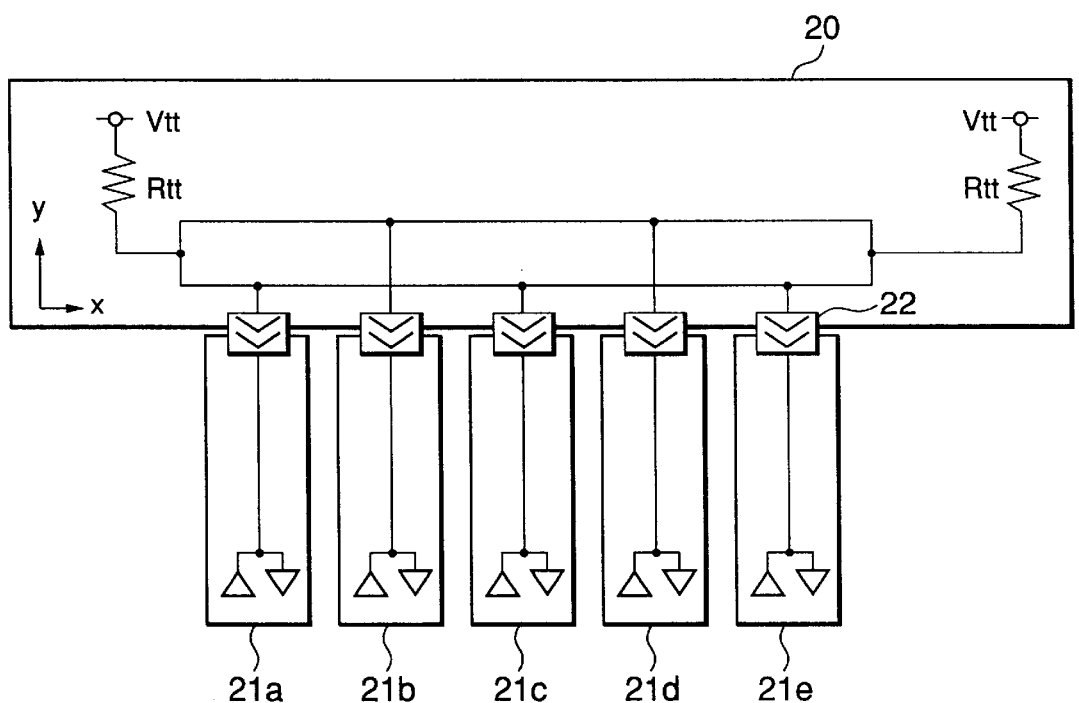
FIG. 9 is a schematic block diagram of a circuit board on which a backplane bus is formed according to the bus system shown in FIG. 1.

FIG. 9 is a schematic block diagram of a circuit board of a backplane bus formed by the bus system shown in FIG. 1.

Reference numeral 20 denotes a mother board on which the main lines 10a, 10b are formed. Reference numerals 21a to 21e denote daughter boards, which correspond to the modules 14a to 14e in FIG. 1.

Resistors 15a, 15b and connectors 22 for connecting the daughter boards 21a to 21e to the main lines 10a, 10b are mounted on the mother board 20.

Description will be given of the arrangement of the daughter boards 21a to 21e and the mother board 20 as shown in FIG. 9.

Figure 10:
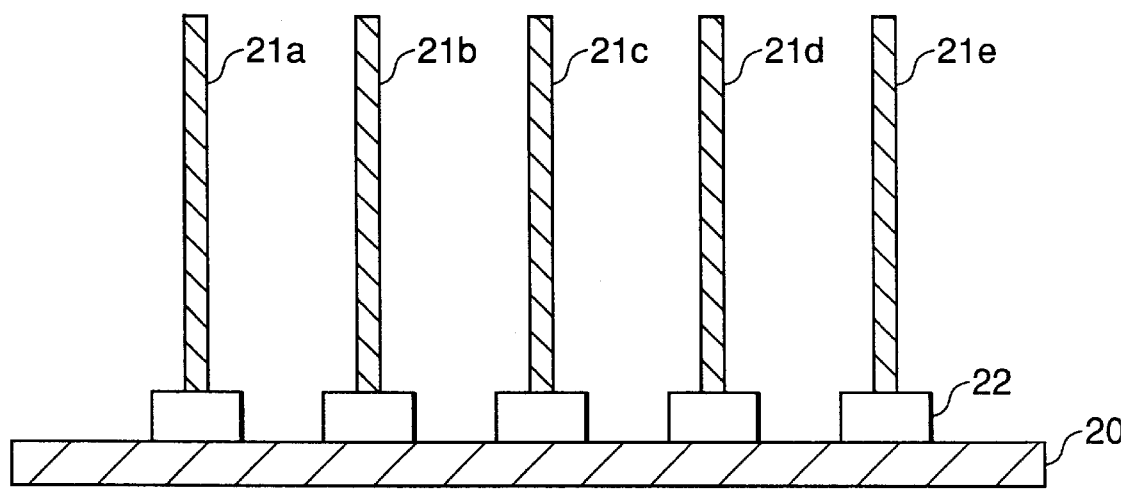
FIG. 10 is a diagram for explaining the arrangement of the mother board 20 and the daughter boards 21a to 21e when the connectors 22 are mounted on one surface of the mother board 20 in FIG. 9.

FIG. 10 is a diagram for explaining the arrangement of the daughter boards 21a to 21e and the mother board 20 when the connectors 20 are mounted on only one surface of the mother board 20.

In this case, the daughter boards 21a to 21e are mounted through the connectors 22 to only one surface of the mother board 20. With this arrangement, attaching and detaching the daughter boards 21a to 21e can be done only on one side of the mother board, so that greater degrees of freedom can be provided for design of the housing.

Figure 11:
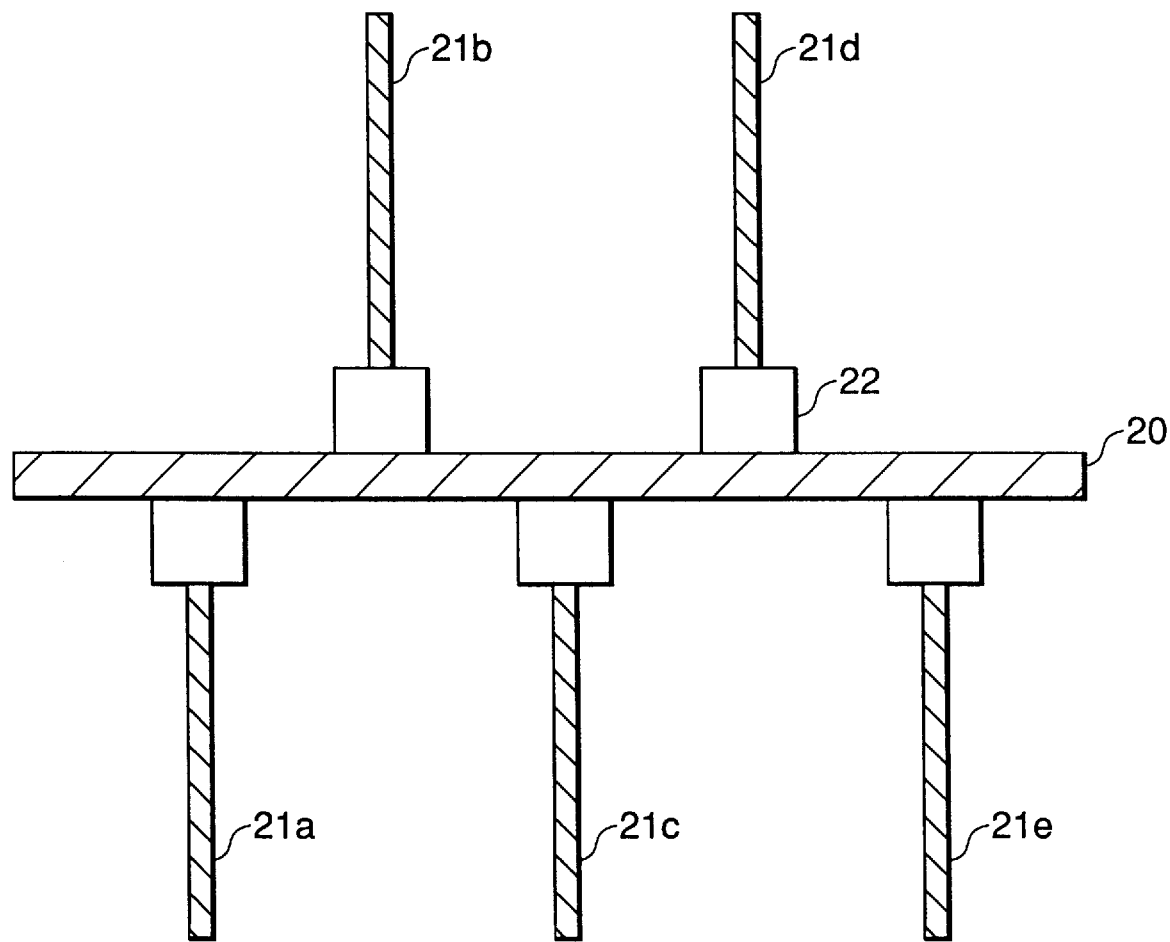
FIG. 11 is a diagram for explaining the arrangement of the mother board 20 and the daughter boards 21a to 21e when the connectors 22 are mounted on both surfaces of the mother board 20 in FIG. 9.

FIG. 11 is a diagram for explaining the arrangement of the mother board 20 and the daughter boards 21a to 21e when the connectors 22 are mounted on both surfaces of the mother board 20.

By making it possible to mount the daughter boards 21a to 21e to both surfaces of the mother board 20, the board area of the mother board 20 can be reduced. In addition, the wiring length of the main line can be shortened, so that the propagation time of a signal propagating along the main line can be further shortened.

Next, the cross sectional configuration of the circuit board as shown in FIG. 9 will be explained.

Figure 12:
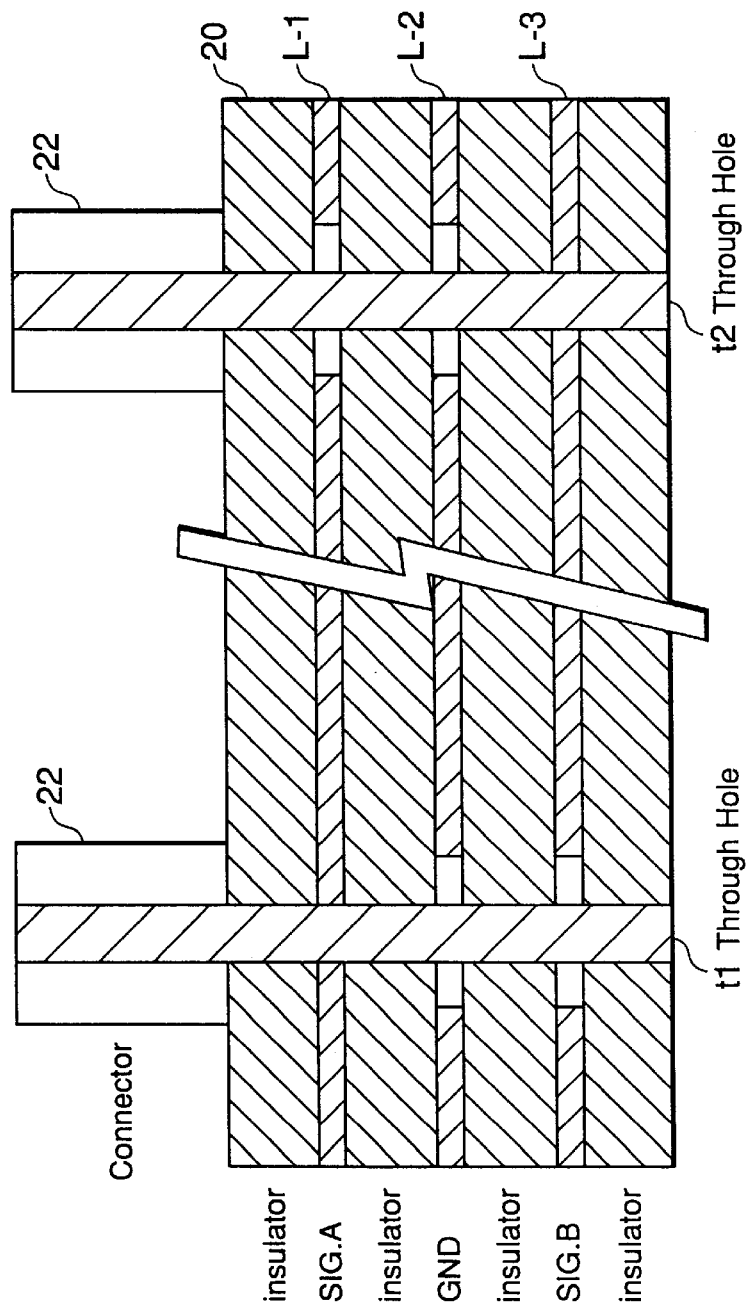
FIG. 12 is a schematic sectional view of the circuit board in FIG. 9.

FIG. 12 is a schematic sectional view of the circuit board shown in FIG. 9 and depicts a part of the cross section in the wiring direction (X-direction in FIG. 9) of the main lines 10a, 10b. Description will be given of a case where the connectors 22 are mounted on only one surface of the mother board 20.

In FIG. 12, t1 and t2 denote a plurality of pins of the connectors to mechanically and electrically connect the mother board 20 with the daughter boards 21a to 21e. The pins t1 and t2 are passed through the mother board 20, and connected to the specified wires in the mother board 20.

The mother board 20 is a multi-layer circuit board formed by laminating an insulator, a signal layer (SIG.A) L-1, an insulator, a ground layer (GND) L-2, an insulator, a signal layer (SIG.B) L-3, and an insulator in this order from the connector 22 side.

The pin t1 is connected to the signal layer L-1, but not connected to the signal layer L-3 and the ground layer L-2. In FIG. 12, the white portions of the signal layer L-3 and the ground layer L-2 indicate the clearances. Similarly, the pin t2 is connected to the signal layer L-3, but not connected to the signal layer L-1 and the ground layer L-2. The white portions of the signal layer L-1 and the ground layer L-2 indicate the clearances.

Though not illustrated, the signal layers L-1 and L-3 are linked together via through-holes provided at both ends, thus forming a main line in a ring shape. The ground layer L-2 arranged between the signal layers L-1 and L-3 breaks up electrostatic coupling between the signal layers L-1 and L-3 to thereby reduce crosstalk.

The above-mentioned configuration, which suppresses crosstalk noise, enables the main lines 10a, 10b of the present embodiment to be fabricated on the mother board. Thus, it becomes possible to form a bus with less noise, so that the speedup of the bus can be realized and the system performance can be improved.

The first embodiment of the present invention has been described above, and a second embodiment of the present invention will be described in the following.

Figure 13:
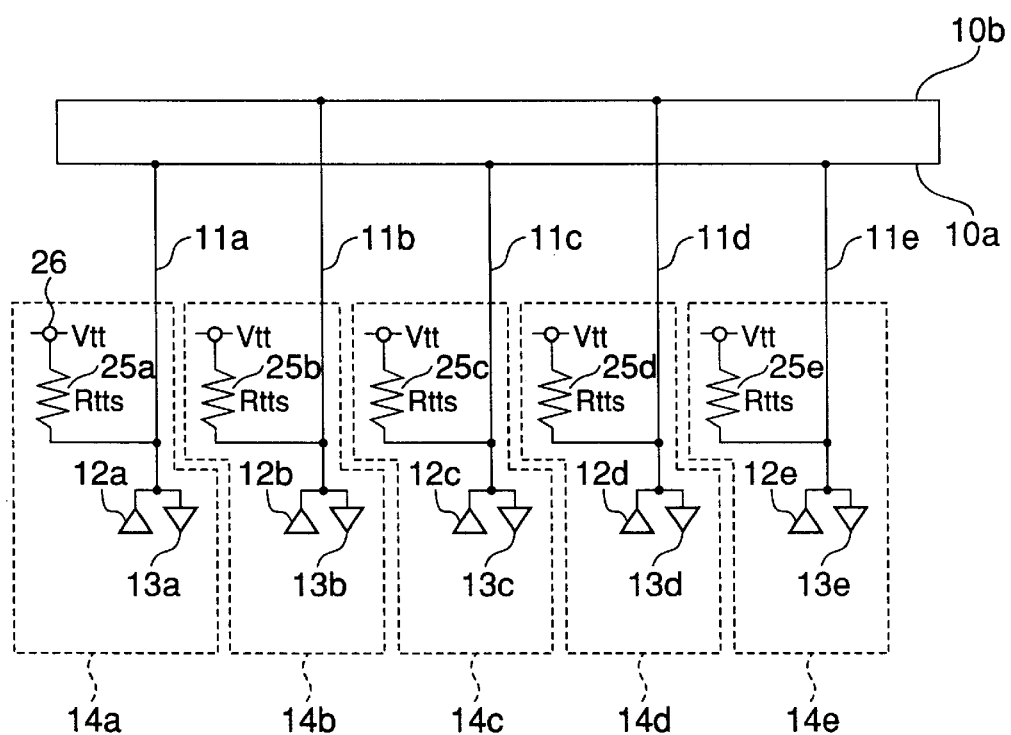
FIG. 13 is a schematic block diagram for explaining the bus system to which a second embodiment of the present invention is applied.

FIG. 13 is a schematic block diagram for explaining the bus system to which a second embodiment of the present invention is applied. The circuit components with the same functions as those in the first embodiment of the present invention in FIG. 1 are designated by the same reference numerals.

A difference of the second embodiment from the first embodiment is that resistors (Rtts) 25a to 25e are inserted at the ends of the respective stub lines 11a to 11e instead of the resistors (Rtt) 15a, 15b being inserted at each end of the main lines 10a, 10b. Note that the main lines 10a, 10b are connected in a ring shape as in the first embodiment.

The resistors (Rtts) 25a to 25e are connected at one end to the module side portions of the corresponding stub lines 11a to 11e, and at the other end to constant-voltage sources (Vtt) 26. The resistors (Rtts) 25a to 25e prevent signal reflection in the corresponding stub lines 11a to 11e. The values of the resistors (Rtts) 25a to 25e are expressed by the following equation.

$$Rtts = N*Zo/2 \qquad (Eq.2)$$

where Zo stands for the characteristic (line) impedance of the bus and N stands for the number of modules connected to the bus. In this equation, the combined resistance of the resistors (Rtts) 25a to 25e is made to become the same value as the combined resistance of the resistors (Rtt) 15a and 15b shown in FIG. 1.

For example, if the characteristic impedance of the bus is 50Ω, the value of the resistors (Rtt) 15a, 15b in FIG. 1 is 50Ω each, and the combined resistance is 25Ω. On the other hand, in the second embodiment in FIG. 13, since N=5, Rtts=125Ω according to (Eq.2). Therefore, the combined resistance is 25Ω, which is the same value as in the first embodiment of FIG. 1.

In this case, the voltage level of a DC signal propagating on the bus can be made the same as in the first embodiment shown in FIG. 1. Therefore, the interface circuit (including a driver and a receiver) used in the first embodiment in FIG. 1 can be applied just as it is. This means that it is possible to reuse the same design and decrease man-hours expended in design.

In the first embodiment in FIG. 1, the resistors (Rtt) 15a, 15b are connected at the positions of the mutually remotest ends in terms of electrical characteristics on the ring bus composed of the main lines 10a, 10b. Accordingly, the distance to the resistor (Rtt) 15a or 15b differs between the driver 12a and the driver 12e.

In contrast, in the second embodiment, the resistors (Rtts) 25a to 25e are inserted in the stub lines 11a to 11e equally spaced around the ring bus, so that the load condition is symmetrical as viewed from any one of the drivers 12a to 12e. Therefore, the signal waveform is the same whichever driver drives, with the result that the design of the bus system becomes easy.

Figure 14:
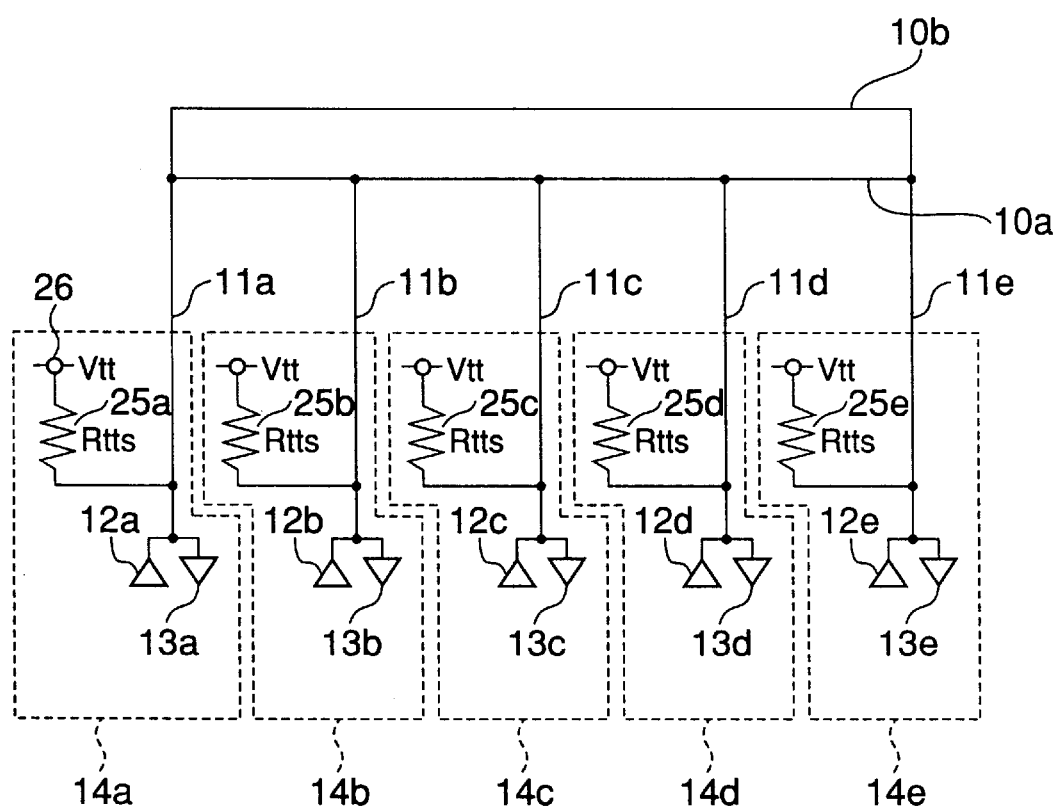
FIG. 14 is a diagram for explaining a modification of the bus system to which the second embodiment of the present invention is applied.

Also in the second embodiment, like in the first embodiment, the stub lines 11a to 11e may be connected to either one of the main lines 10a, 10b as shown in FIG. 14. Furthermore, like in the first embodiment, SSTL interface circuits may be used. Furthermore, the circuit board may be formed using the same method as in the first embodiment.

The second embodiment of the present invention has been described.

In the first and the second embodiments, description has been made of the bus in a ring shape formed by connecting together two main lines, but the present invention is not limited to this bus arrangement. A bus may be formed by connecting three or more lines together at both ends.

Description will next be given of a third embodiment of the present invention.

Figure 15:
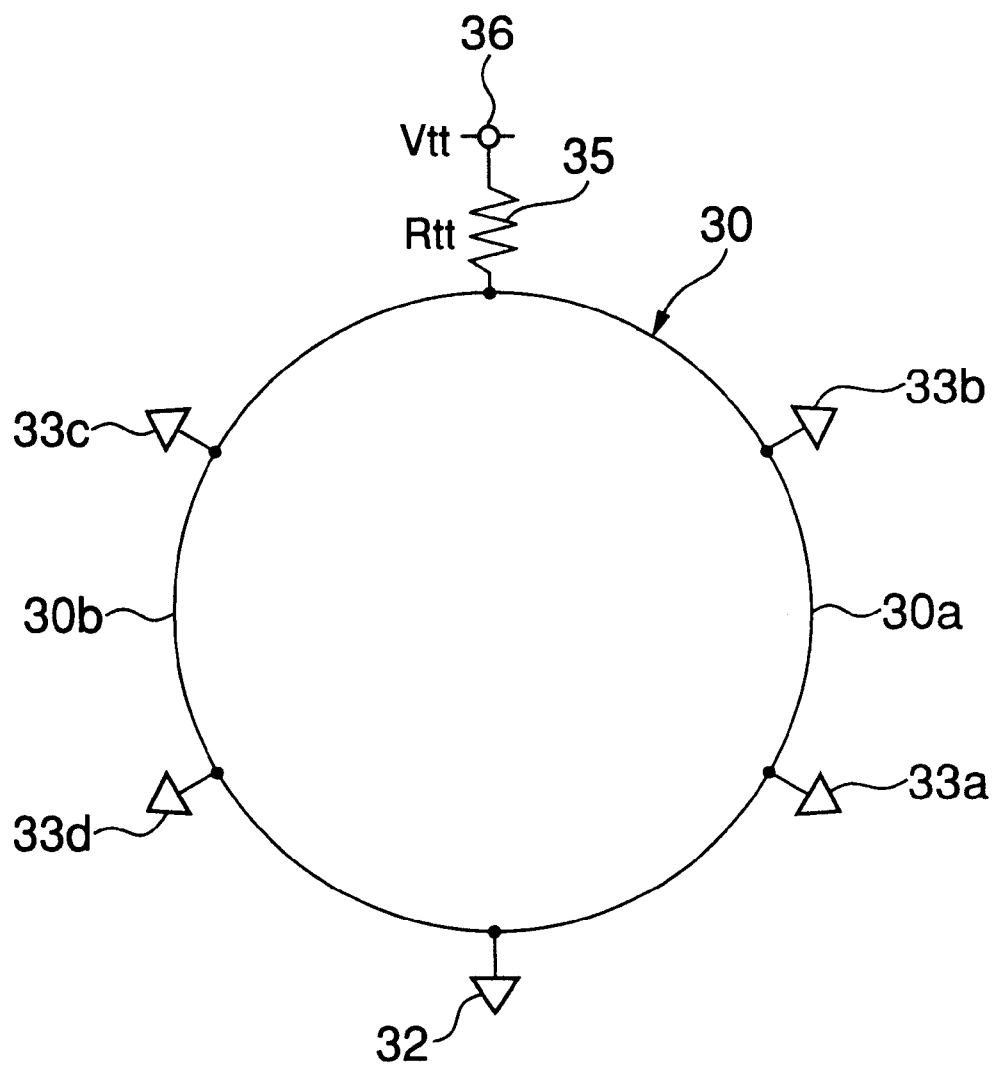
FIG. 15 is a schematic block diagram for explaining the bus system to which a third embodiment of the present invention is applied.

FIG. 15 is a schematic block diagram for explaining the bus system to which the third embodiment is applied.

In FIG. 15, reference numeral 30 denotes a main line, 32 denotes a driver, 33a to 33d denote receivers, 35 denotes a resistor (Rtt), and 36 denotes a constant-voltage source (Vtt).

The main line 30 forms a bus in a ring. This ring bus may be formed by connecting two main lines together at both ends like in the first and the second embodiments described above. For example, as shown in FIG. 12, in a circuit board having two main lines laminated while they are isolated by insulator layers and a ground layer, a ring bus may be formed by connecting the two main lines together at both ends via through-holes.

The driver 32 and the resistor (Rtt) 35 are connected at the mutually remotest ends in terms of electrical characteristics on the main line 30. The receivers 33a to 33d are arranged at positions symmetrical in terms of electrical characteristics with respect to a center line connecting the driver 32 and the resistor (Rtt) 35 (on an equivalent circuit). In addition, the driver 32, the resistor (Rtt) 35 and the receivers 33a to 33d are connected to the positions equally spaced.

The resistor (Rtt) 35 is set at a value about a half of the characteristic impedance Zo of the main line 30.

In the third embodiment, on the main line 30, the resistor (Rtt) 35 is arranged at the remotest end from the driver 32 and the receivers 33a to 33d are arranged symmetrical with respect to the driver 32. Therefore, a signal waveform from the driver 32 reaches the resistor (Rtt) 35 at the same time whether it goes along the CW route or the CCW route. Since the line is terminated completely by the resistor (Rtt) 35, no reflected wave is produced. The reason for this can be explained as follows.

With regard to the routes from the driver 32 to the resistor (Rtt) 35, the CW route as viewed from the driver 32 is called the main line 30a and the CCW route as viewed from the driver 32 is called the main line 30b. Because the characteristic impedance Zo of each main line is Zo and the load distribution is equal, the propagation velocity of a signal propagating on each route is the same.

When the connection point of the main line 30 with the resistor (Rtt) 35 is viewed from the side of the main line 30a, the impedance at the connection point is a combined impedance Z1 of the resistor (Rtt) 35 and the main line 30b. Z1 can be expressed by the following equation.

$$Z1 = 1/(1/Rtt + 1/Zo) \quad (Eq.3)$$
$$= (1/3) * Zo$$

where Rtt=Zo/2. Since the characteristic impedance of the main line 30a differs from the above-mentioned impedance Z1, when a voltage signal propagating along the main line 30a reaches the connection point of the main line 30 with the resistor (Rtt) 35, a reflected wave is produced. The reflection coefficient Γ of the reflected wave is expressed as follows.

$$\Gamma = (Z1 - Zo)/(Z1 + Zo) \quad (Eq.4)$$
$$= -0.5$$

In other words, a half of the original signal voltage is reflected. Because the propagation coefficient is (1+Γ), that is, the signal voltage propagating from the main line 30a to the main line 30b becomes a half of the original signal voltage propagates (0.5=1−0.5).

Similarly, with regard to a signal voltage propagating from the side of the main line 30b to the connection point between the main line 30 and the resistor (Rtt) 35, at the connection point, a half of the original signal voltage is reflected, and the other half passes.

If a signal going on the main line 30a and a signal going on the main line 30b, each in the same waveform, simultaneously reach the resistor (Rtt) 35, then on the main line 30a, a reflected wave with a reflection coefficient Γ=−0.5 and a propagating wave with a propagation coefficient (1+Γ)=0.5 overlap each other and become 0. In other words the reflection coefficient Γ apparently becomes 0. Therefore, reflection can be eliminated by setting the terminating resistor (Rtt) at a half value of the characteristic impedance Zo of the main line 30 and also arranging for the signals going on the CW and the CCW routes to reach the resistor (Rtt) at the same time. More specifically, perfect termination can be achieved.

As described above, because perfect termination can be achieved with only one terminating resistor, the number of parts required can be reduced. In other words, the system can be configured at a lower cost.

Figure 16:
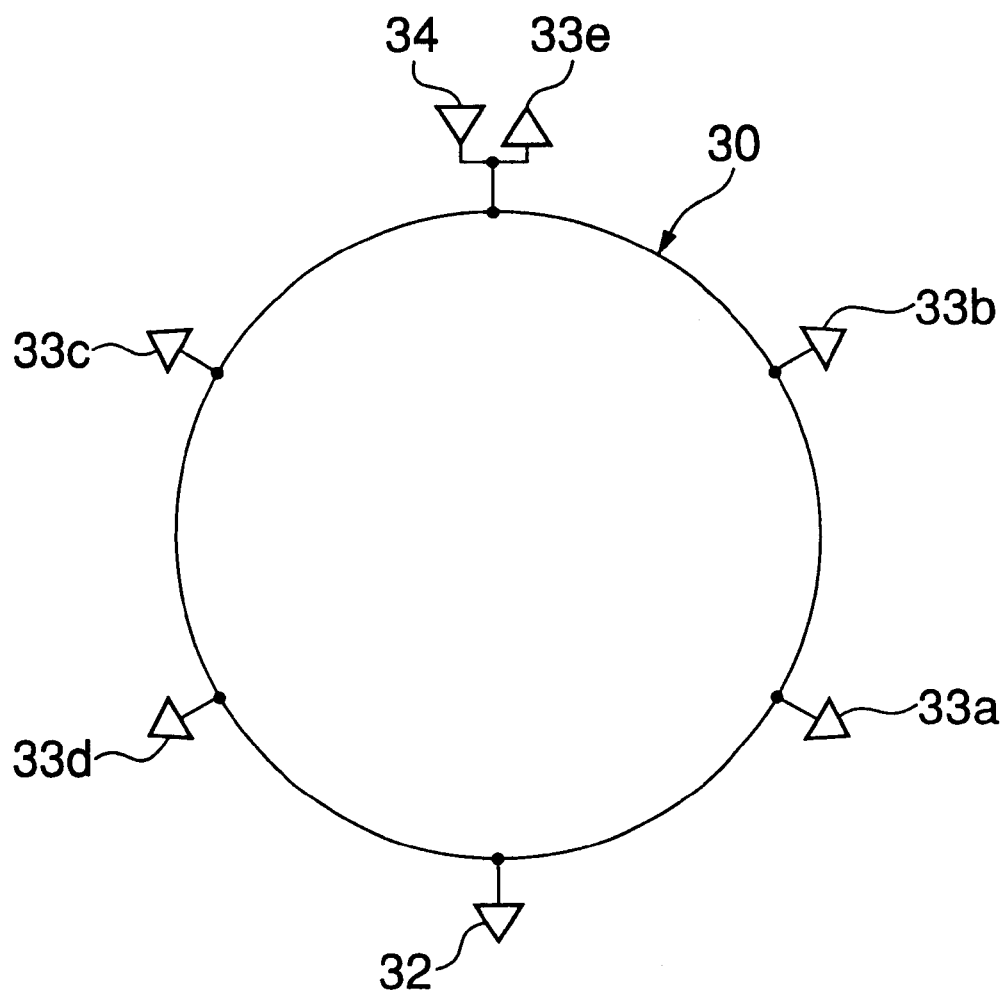
FIG. 16 is a diagram for explaining a modification of the bus system to which the third embodiment of the present invention is applied.

In this third embodiment, matched termination may be performed by using, in place of the resistor (Rtt) 35, a driver 34 with an impedance half as high as the characteristic impedance Zo of the main line 30 as shown in FIG. 16.

Figure 17:
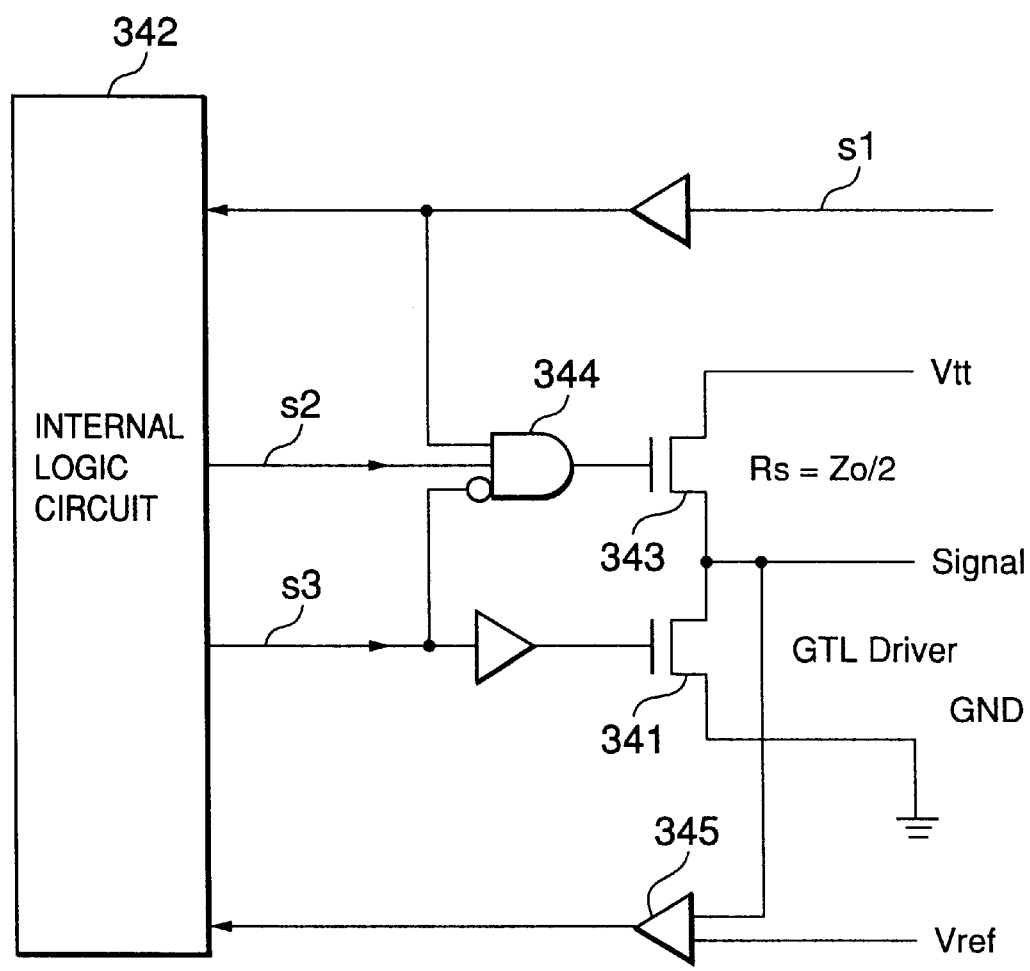
FIG. 17 is a diagram showing a schematic configuration of the driver 34 for termination shown in FIG. 16.

FIG. 17 is a schematic configuration of the terminating driver 34 shown in FIG. 16.

This driver 34 performs a function of a terminating driver and also a function of a bus interface. Here, description will be given of a case where an open-drain type driver, such as a GTL circuit, is used for the bus interface. Matched termination as mentioned above can be achieved not only with an open-drain type driver but also with a push-pull type driver, such as a CTT or SSTL circuit.

In FIG. 17, reference numeral 341 denotes a data driver formed by a FET transistor. This data driver outputs onto a signal line a signal transmitted from a logic circuit 342 of LSI, for example. Note that though not illustrated, in some cases, the data driver 341 also comprises a slew rate controller.

Reference numeral 343 denotes a terminating driver formed of an FET transistor and having an output impedance at a half value of the characteristic impedance Zo of the bus. Reference numeral 344 denotes an AND circuit for driving the terminating driver 343.

The logic circuit 342 refers to information stored in its own register to check if the logic circuit 342 itself has the bus using right in the next cycle for data transfer. If the logic circuit 342 has made sure that it does not have the bus using right, it outputs a termination signal on a signal line s2.

Under the condition that a termination control signal is output on the signal line s1 and a termination signal is output on the signal line s2, only when data is not output on the signal line s3, an AND circuit 344 turns on the terminating driver 343. Because the terminating driver 343 is connected to the terminal voltage Vtt, the main line 30 connected to the Signal line is terminated in matched termination by an output impedance (Rs=Zo/2) of the terminating driver 343.

In FIG. 17, reference numeral 345 denotes a differential type data receiver. The data receiver 345 compares the voltage of the signal line with the reference voltage Vref to detect a signal that arrived through the signal line, and transmits the signal to the logic circuit 342. The data receiver 345 is able to detect a signal even when the terminating driver 343 is on.

The driver, formed as described, can be substituted for the terminating resistor. Thus, the terminating resistor can be eliminated.

The third embodiment of the present invention has been described.

A fourth embodiment of the present invention will now be described.

Figure 18:
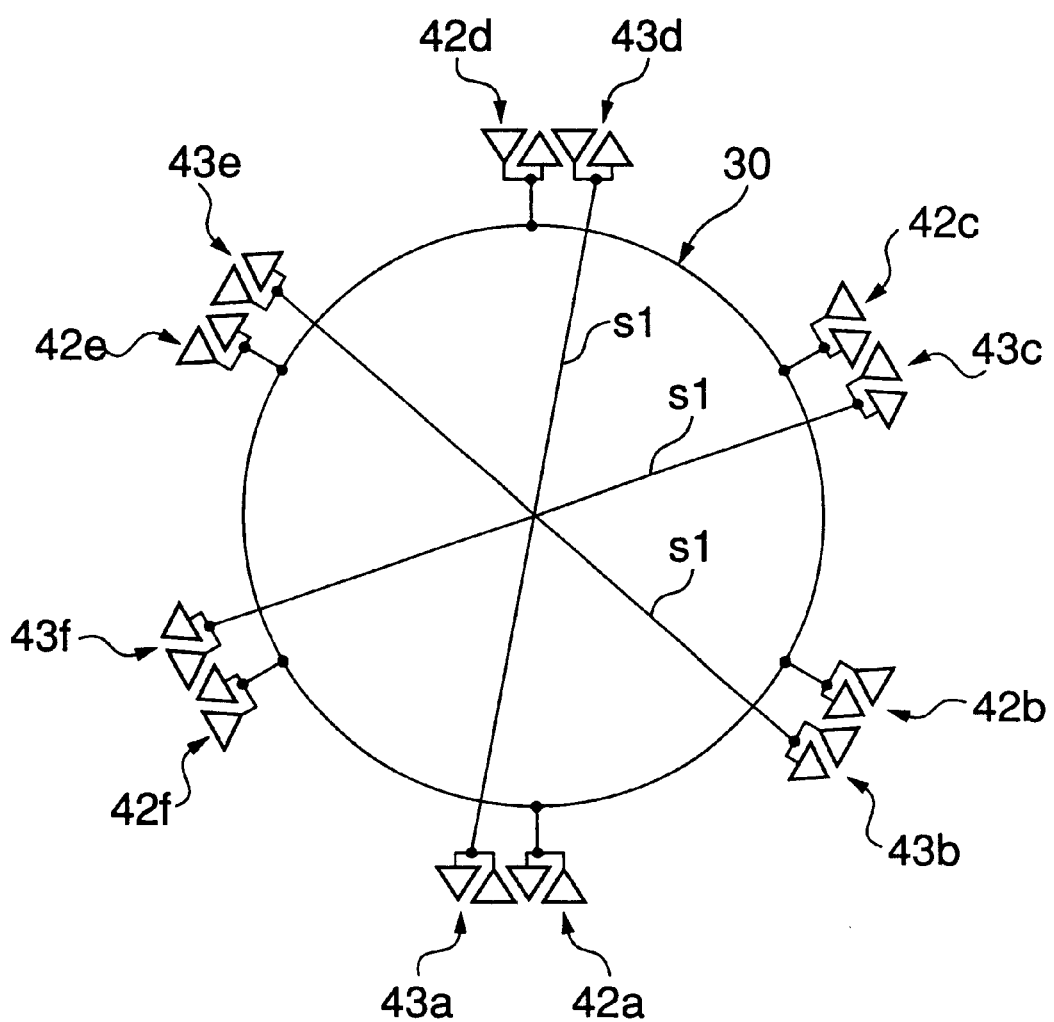
FIG. 18 is a schematic block diagram of the bus system to which a fourth embodiment of the present invention is applied.

FIG. 18 is a schematic block diagram of the bus system to which a fourth embodiment of the present invention is applied. In FIG. 18, the components with the same functions as those in the third embodiment shown in FIG. 15 are designated by the same reference numerals.

In FIG. 18, reference numerals 42a to 42f denote bus interface circuits each having the function of a terminating driver. The bus interface circuits 42a to 42f are connected through stub lines to the main line 30, and are equally spaced along the main line 30. The bus interfaces circuits 42a to 42f are connected on the main line 30 symmetrically in terms of electrical characteristics with regard to a center line interconnecting between two bus interface circuits which are arranged at the mutually remotest end positions on the main line 30 in terms of electrical characteristics.

Reference numerals 43a to 43f denote termination control signal interface circuits provided on a one-to-one correspondence with the bus interface circuits 42a to 42f and are used to transmit and receive termination control signals to make the bus interface circuits function as the terminating drivers. Among the termination control signal interface circuits 43a to 43f, those which are arranged at the mutually remotest end positions on the main line 30 in terms of electrical characteristics are connected through signal lines s1 as illustrated in FIG. 18. To take an example, the termination control signal interface 43a is connected through a signal line s1 with the termination control signal interface 43d.

In the bus system according to the fourth embodiment, for example, when the bus interface circuit 42a outputs data on the main line 30, the termination control signal interface circuit 43a corresponding to the bus interface circuit 42a outputs a termination control signal onto the signal line s1.

When the termination control signal interface circuit 43d receives this termination control signal, it causes the bus interface 42d to operate as the terminating driver.

As described above, in the fourth embodiment, when any one of the bus interface circuits 42a to 42f sends data, the one of the bus interface circuits 42a to 42f that is the remotest from the sending bus interface circuit is made to operate as the terminating driver.

A signal is sent from a bus interface circuit and propagates clockwise and counterclockwise on the main line 30, and the signals that have traveled along the CW and the CCW routes reach the connection point between a bus interface circuit remotest from the sending bus interface circuit and the main line 30 at almost the same time. In this embodiment, by using the bus interface circuit arranged at the remotest end position as the terminating driver, it is possible to suppress the occurrence of reflected waves.

Description will now be given of the schematic configuration of the bus interface circuit and the termination control signal interface circuit used in the fourth embodiment.

Figure 19:
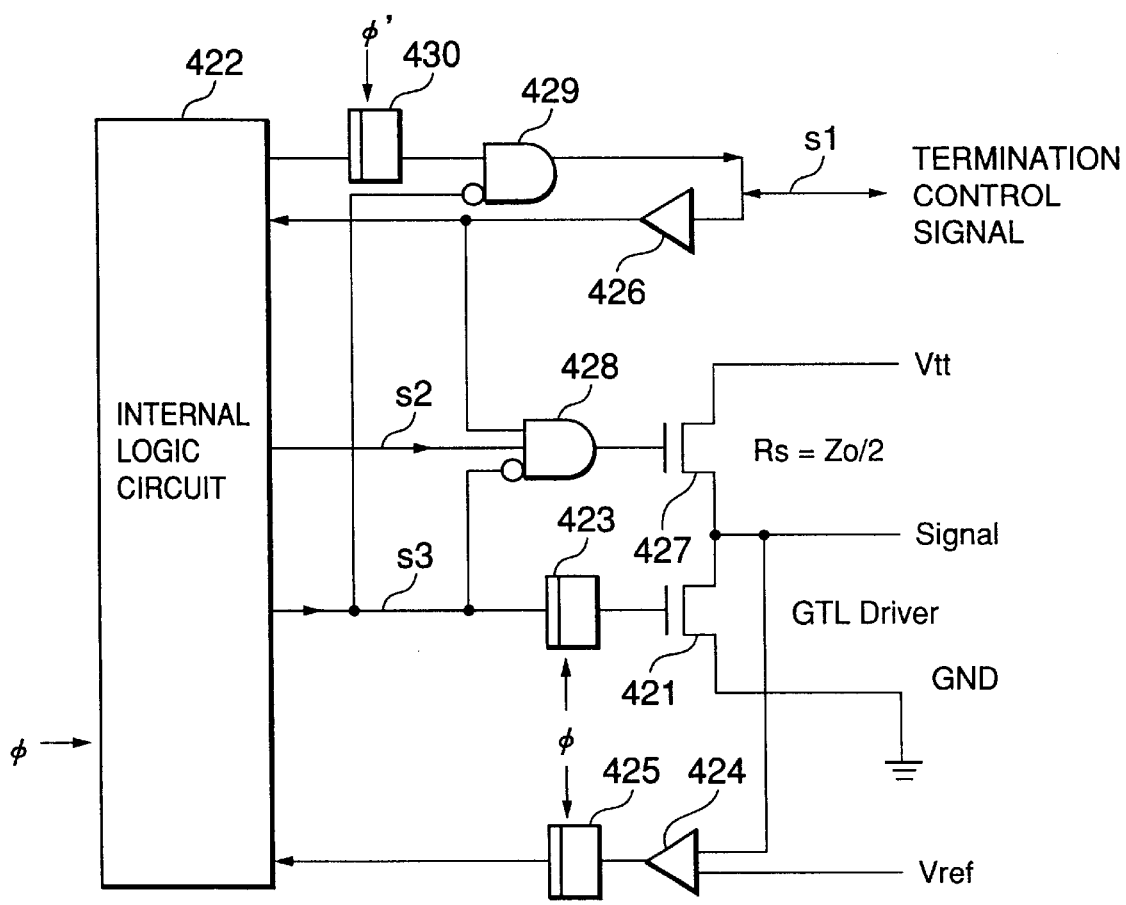
FIG. 19 is a schematic block diagram showing the bus interface circuit and the terminal control signal interface circuit shown in FIG. 18.

FIG. 19 is a schematic configuration diagram showing the bus interface circuit and the termination control signal interface circuit used in the fourth embodiment shown in FIG. 18.

Description is given of a case where an open-drain type interface, such as a GTL circuit, is used as the bus interface. However, in the fourth embodiment, like in the third embodiment, matched termination can also be achieved by a push-pull driver, such as a CTT circuit or an SSTL circuit.

In FIG. 19, reference numeral 421 denotes a data driver formed by an FET transistor. The data driver outputs on the signal line a signal from a logic circuit 422 formed by an LSI circuit. A latch 423 causes timing at which signals are transmitted to be in synchronism with a system bus clock φ.

Reference numeral 424 denotes a differential type data receiver. The differential type data receiver 424 compares the voltage of the signal line with the reference voltage Vref to detect a signal on the Signal line, and sends the signal through a latch 425 to the logic circuit 422. A latch 425 sets timing for transmitting signals so as to be in synchronism with the system bus clock φ.

Reference numeral 426 denotes a termination control signal receiver that transfers a received termination control signal to the logic circuit 422.

Reference numeral 427 denotes a terminating driver formed by an FET transistor and having an output impedance at a half value of the characteristic impedance Zo of the bus.

Reference numeral 428 denotes an AND circuit for driving the terminating driver 427.

Reference numeral 429 denotes a driver for a termination control signal. The driver 429 transmits a termination control signal before the driver 421 transmits a signal.

A latch 430 causes timing for transmitting a termination control signal to be in synchronism with the clock φi. The clock φi has a difference from the system bus clock φn a difference greater than a time required for switching over the operation of the bus interface circuit to the operation as the terminating driver.

Description will be given of the operation as the terminating driver of the bus interface circuit that is structured as described above.

The logic circuit 422 refers to information stored in its own register to check if the logic circuit 422 itself has the bus using right in the next cycle for data transfer. When it confirmed that it does not have the bus using right, the logic circuit 422 outputs a termination signal onto the signal line s2.

Under a condition that a termination control signal is output on the signal line s1 and a termination signal is output on the signal line s2, only when data is not output on the signal line s3, an AND circuit 428 turns on the terminating driver 427.

Because the terminating driver 427 is connected to the terminal voltage Vtt, the main line 30 connected to the signal line is terminated in matched termination by an output impedance (Rs=Zo/2) of the terminating driver 427.

Next, description will be given of a case where the bus interface circuit outputs a termination control signal.

When outputting a signal onto the bus, the logic circuit 422 first obtains the bus using right, and outputs a termination control signal through the driver 429 before the driver 421 transmits a data signal. As described above, the latch 430 is timing of sending a termination control signal is set to be earlier than the latch 423 is timing of sending a data signal by more than a length of time required for switching over the operation of the bus interface circuit into the operation as the terminating driver.

With the above arrangement, a data signal can be output on the bus after the operation of the bus interface circuit at the remotest end position has been switched to the operation as the terminating driver.

The termination control signal is preferably pulled up or pulled down to prevent it from being indeterminate.

In the fourth embodiment, when a certain bus interface circuit outputs a signal on the bus, the bus interface circuit arranged at the remotest end position from the sending bus interface is switched to the terminating driver. With this scheme, whichever bus interface circuit outputs a signal on the bus, the termination of signal transfer is performed on the bus interface at the remotest end from the sending bus interface. Therefore, data transfer with reduced waveform distortion and less noise can be achieved and a high-speed bus can be realized.

The fourth embodiment of the present invention has been described.

Description will move on to a fifth embodiment of the present invention.

Figure 20:
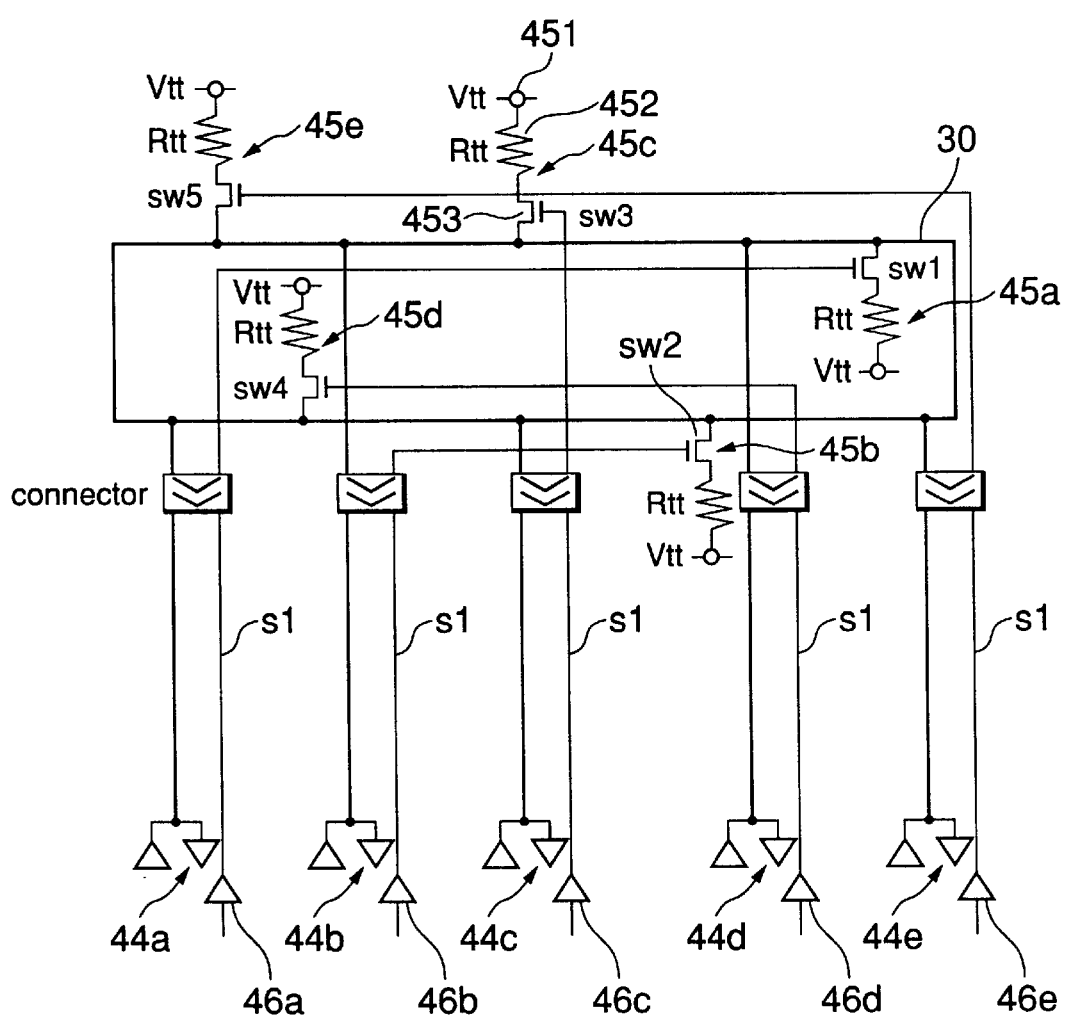
FIG. 20 is a schematic block diagram of the bus system to which a fifth embodiment of the present invention is applied.

FIG. 20 is a schematic configuration diagram of the bus system to which a fifth embodiment of the present invention is applied. The components which have the same functions as those in the third embodiment are designated by the same reference numerals.

In FIG. 20, reference numerals 44a to 44e denote bus interface circuits. The bus interface circuits 44a to 44e are respectively connected through their corresponding stub lines to the main line 30.

Reference numerals 45a to 45e denote terminal circuits. Each of the terminal circuits 45a to 45e includes a resistor (Rtt) 452, which is connected at one end to a constant-voltage source (Vtt) 451, and a switch 453, which is inserted between the other end of the resistor 452 and the main line 30. The terminal circuits 45a to 45e are each arranged on the main line 30 at the remotest end position in terms of electrical characteristics from the bus interface circuits 44a to 44e of the corresponding numerals (for example, the bus interface circuit 44a corresponds to the terminal circuit 45a). The bus interface circuits are connected to the main line 30 so as to be symmetrical in electrical characteristics with respect to a center line connecting between any one of the bus interface circuits and its corresponding terminal circuit.

Reference numerals 46a to 46e denote termination control signal drivers provided on a one-to-one correspondence with the bus interface circuits 44a to 44e. When a bus interface circuit sends a data signal onto the main line 30, the corresponding termination control signal driver at the sending end transmits a signal to the termination control signal driver at the remotest end of data transfer. The signal is a termination control signal to turn on the switch 453 of the terminal circuits 45a to 45e corresponding to the bus interface circuit.

In the bus system according to the fifth embodiment, for example, when the bus interface circuit 44a sends a signal onto the main line 30, the terminal signal control driver 46a associated with the bus interface circuit 44a outputs a termination control signal on the signal line s1. In the terminal circuit 45a, the switch 453 is turned on in response to the termination control signal. More specifically, the resistor 452 is connected to the main line 30.

As described above, in the fifth embodiment, when any one of the bus interface circuits 44a to 44e sends a signal, the bus is terminated by the terminal circuit 45a to 45e at the remotest end from the bus interface circuit at the sending end.

A signal is transmitted from a bus interface circuit and signals going clockwise and counterclockwise on the main line 30 almost simultaneously reach the connection point between the main line 30 and the terminal circuit at the remotest end with respect to the bus interface circuit at the sending end. Nevertheless, in the fifth embodiment, the occurrence of reflected waves can be suppressed by connecting the resistor 452 of the terminal circuit at the remotest end position through the switch 453 to the main line 30.

Furthermore, in the fifth embodiment, because relatively simple devices, such as a terminating resistor and a switch, are used in the terminal circuit, the logic circuits can be prevented from becoming complicated.

The fifth embodiment of the present invention has been described.

Finally, description will be given of an information processing unit using the bus systems according to the first to the fifth embodiments.

Figure 21:
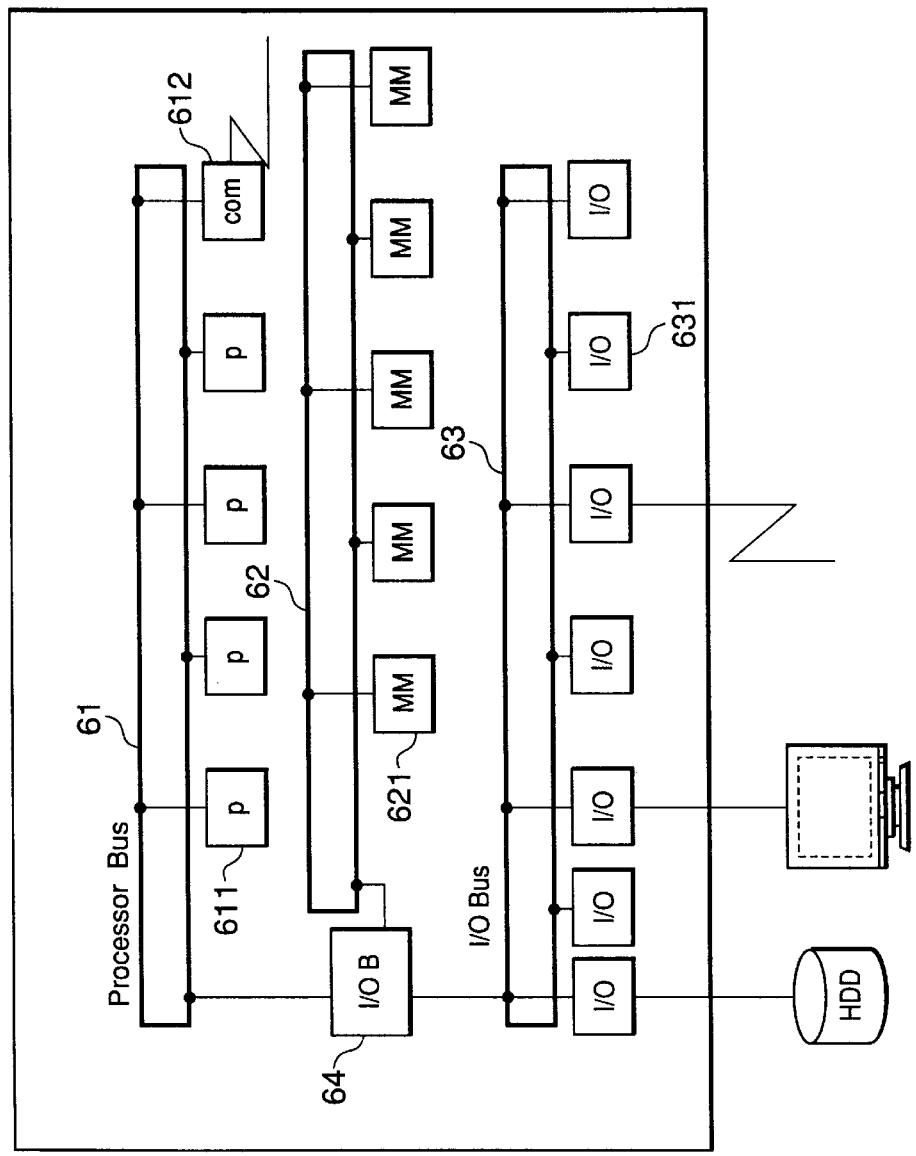
FIG. 21 is a schematic block diagram of an information processor in accordance with the embodiments of the present invention.

FIG. 21 is a schematic configuration diagram of the information processing unit using the embodiments of the present invention.

In this example, the main lines described when reference was made to the respective embodiments are applied to a multiprocessor bus 61, a memory bus 62 and an I/O bus 63.

A plurality of processors 611 and a communication processor 612 are respectively connected to the multiprocessor bus 61 through the stub lines.

A plurality of memories 621 are respectively connected to the memory bus 62 through stub lines.

A plurality of I/O ports 631 for connection to I/O units, including external memories, such as a hard disk, and display units are connected to the I/O bus 63 through the stub lines.

Those buses 61 to 63 are interconnected through an I/O bridge 64.

Though not illustrated, modules (processors, memories, etc.) that are connected to the buses 61 to 63 each include any one of the bus interface circuits described in the respective embodiments. The buses 61 to 63 are terminated by matched termination by any one of the termination methods described in the respective embodiments.

By applying the first to the fifth embodiments to the buses in the respective hierarchical levels of the information processing unit, speedup of the whole system can be achieved.

As has been described, according to the present invention, the signal propagation time between the modules connected to the bus can be shortened, with the result that the system performance can be enhanced.

What is claimed is:

1. A bus system for data transfer among a plurality of interface circuits, comprising:
    a ring bus which is formed by two main lines connected together at both opposite ends; and which is formed on a mother board;
    a plurality of resistors for terminating said opposite ends respectively;
    a plurality of connectors for connecting daughter boards having said interface circuits; and
    a plurality of stub lines for connecting said connectors with said ring bus,
    wherein a plurality of branch points on said ring bus being connected to said stub lines are arranged at the same electrical interval, and said connectors are mounted on the same surface of said mother board.

2. A bus system according to claim 1, wherein said connectors are arranged at the same geometrical interval on the same surface of said mother board.

3. A bus system according to claim 1, wherein said mother board is a multi-layer circuit board having two signal layers separated by insulators and a ground layer, and said two main lines are formed on said two signal layers respectively.

4. A bus system according to claim 1, wherein said two main lines have the same electrical length, and said branch points are arranged at the same electrical interval on one of said two main lines.

5. A bus system for data transfer among a plurality of interface circuits comprising:
    a ring bus which is formed by two main lines connected together at both opposite ends and which is formed on mother board;
    a plurality of connectors for connecting daughter boards having said interface circuits and resistors for terminating said interface curcuit; and
    a plurality of stub lines for connecting said connectors with said ring bus,
    wherein a plurality of branch points on said ring bus being connected to said stub lines are arranged at the same electrical interval, and said connectors are mounted on the same surface of said mother board.

6. A bus system according to claim 5, wherein said resistors have resistance Rtts represented by a formula Rtts=N*Zo/2,
    said N being a number of said daughter boards and Zo being a characteristic impedance of said ring bus.

7. A bus system according to claim 5, wherein said mother board is a multiplayer circuit board having two signal layers separated by insulators and a ground layer, and said two main lines are formed on said two signal layers respectively.

8. A bus system according to claim 5, wherein said two main lines have the same electrical length, and said branch points are arranged at the same electrical interval on said two main lines.

9. A bus system according to claim 5, wherein said connectors are arranged at the same geometrical interval on the same surface of said mother board.

* * * * *